(12) United States Patent
Hu

(10) Patent No.: US 12,263,894 B2
(45) Date of Patent: Apr. 1, 2025

(54) AUTOMOBILE STEERING SIMULATOR STRUCTURE

(71) Applicant: Jian Hu, Shenzhen (CN)

(72) Inventor: Jian Hu, Shenzhen (CN)

( * ) Notice: Subject to any disclaimer, the term of this patent is extended or adjusted under 35 U.S.C. 154(b) by 272 days.

(21) Appl. No.: 18/176,580

(22) Filed: Mar. 1, 2023

(65) Prior Publication Data
US 2024/0092417 A1   Mar. 21, 2024

(30) Foreign Application Priority Data

Sep. 20, 2022 (CN) .......................... 202211146121.8

(51) Int. Cl.
| | |
|---|---|
| *B62D 5/00* | (2006.01) |
| *H02K 1/16* | (2006.01) |
| *H02K 1/27* | (2022.01) |
| *H02K 5/04* | (2006.01) |
| *H02K 7/08* | (2006.01) |
| *H02K 11/21* | (2016.01) |

(52) U.S. Cl.
CPC .............. *B62D 5/006* (2013.01); *H02K 1/16* (2013.01); *H02K 1/27* (2013.01); *H02K 5/04* (2013.01); *H02K 7/08* (2013.01); *H02K 11/21* (2016.01)

(58) Field of Classification Search
CPC . B62D 5/006; G09B 9/04; H02K 1/16; H02K 1/27; H02K 11/21; H02K 26/00; H02K 5/04; H02K 7/08
See application file for complete search history.

(56) References Cited

U.S. PATENT DOCUMENTS

| | | | |
|---|---|---|---|
| 2016/0190898 A1* | 6/2016 | Yamashita | H02K 11/225 310/68 B |
| 2019/0217885 A1* | 7/2019 | Figura | H02K 5/161 |
| 2019/0232999 A1* | 8/2019 | Yamashita | H02K 5/22 |
| 2020/0148248 A1* | 5/2020 | Wilske | B62D 5/006 |

* cited by examiner

*Primary Examiner* — Christopher M Koehler
*Assistant Examiner* — Ethan Nguyen Vo
(74) *Attorney, Agent, or Firm* — Jeenam Park

(57) ABSTRACT

An automobile steering simulator structure comprising a shell rotor, a coil stator, permanent magnets, a base, a steering wheel, the shell rotor, the coil stator and the permanent magnets form a slice motor, a first cavity is provided inside the base, a front end cover is screwed on a side of the shell rotor away from the base, a second cavity is between the front end cover and the shell rotor, a first PCB board is arranged inside of the first cavity and a second PCB board is arranged inside of the second cavity, a magnetic encoder rotating shaft rotationally installed in middle of the base is arranged between the first and second cavity, a conductive slip ring is arranged outside the shaft, both ends of the conductive slip ring are respectively connected to the first and second PCB board, a position sensor is arranged at bottom of the shaft.

7 Claims, 6 Drawing Sheets

12,263,894 B2

AUTOMOBILE STEERING SIMULATOR STRUCTURE

CROSS-REFERENCE TO RELATED APPLICATIONS

This is a U.S. patent application which claims the priority and benefit of Chinese Patent Application Number 202211146121.8, filed on Sep. 20, 2022, the disclosure of which is incorporated herein by reference in its entirety.

TECHNICAL FIELD

The present application belongs to the technical field of automobile steering, and in particular relates to an automobile steering simulator structure.

BACKGROUND

In the field of automobile and racing simulators, motor is generally used as steering force feedback driving mechanism as shown in FIG. 8. The motor and the steering wheel are connected through a coupling, as shown in the figure below. Due to the separate design of the two, the product is bulky and expensive. The existence of the coupling makes the transmission of force feedback to the steering wheel indirect, and the subtle road feeling feedback is lost, which affects the experience. However, the electronic equipment on the steering wheel is powered by wireless power supply, wired power supply, or built-in battery power supply, and the system is complex and complicated.

SUMMARY

The purpose of the present application is to provide a automobile steering simulator structure, which is small in size, easy to use, and can reduce the loss of road feeling feedback. At the same time, a conductive slip ring is used to transmit the power supply and the sending and receiving signals of the steering wheel to avoid the use of traditional power supply systems such as wireless charging, wired power supply, and built-in batteries, and its structure is simple.

In order to achieve the above object, the present application provides the following technical solutions: An automobile steering simulator structure comprises a shell rotor, a coil stator, permanent magnets, a base, a steering wheel, wherein the shell rotor, the coil stator and the permanent magnets form a slice motor, the steering wheel is connected to outside of the shell rotor, and the shell rotor is rotationally connected to the base, the coil stator is arranged between the shell rotor and the base, the permanent magnets are arranged between the coil stator and the shell rotor, a first cavity is provided inside the base, a front end cover is screwed on a side of the shell rotor away from the base, a second cavity is between the front end cover and the shell rotor, a first PCB board is arranged inside of the first cavity and a second PCB board is arranged inside of the second cavity, a magnetic encoder rotating shaft rotationally installed in middle of the base is arranged between the first cavity and the second cavity, a conductive slip ring is arranged outside the magnetic encoder rotating shaft, both ends of the conductive slip ring are respectively connected to the first PCB board and second PCB board for transmitting signals, a position sensor is arranged at bottom of the magnetic encoder rotating shaft.

Furthermore, a rear end cover is screwed on the base, base mounting holes arranged along a circumferential direction are formed on the rear end cover, and a mounting plate is also screwed on the rear end cover, the mounting plate is provided with an USB interface and an external power supply port, and the USB interface and external power supply port are all connected with the first PCB board through wires.

Furthermore, the shell rotor and the base are rotationally assembled through bearings, and a first bearing and a second bearing are provided in a height direction of the base, wherein the first bearing is arranged near the rear end cover, and the second bearing is arranged near the front end cover.

Furthermore, a fastening screw is arranged between the shell rotor and the base, and an outer ring of the first bearing is locked by the fastening screw.

Furthermore, the steering wheel and the shell rotor are an integrated structure.

Furthermore, base mounting holes arranged along a circumferential direction are formed on the base, and the base is provided with an USB interface and an external power supply port, and the USB interface and the external power supply port are all connected with the first PCB board through wires.

Furthermore, the steering wheel is screwed on a side of the shell rotor close to the front end cover.

The beneficial effect of the present application is:

1. The shell rotor, coil stator, and permanent magnet are integrated into a slice motor, and the slice motor is integrated into the steering simulation integrated mechanism. The size of the system is far smaller than the traditional motor and steering wheel separation design, and the traditional coupling is omitted. The force feedback generated by the motor is transmitted to the steering wheel grip ring without any loss.

2. The conductive slip ring and PCB board are used to integrate the motor drive structure and button control structure in a small mechanism. By this way, the overall structure is compact, the number of parts is greatly reduced compared with the traditional motor and steering wheel separation design, and the system cost is greatly reduced.

Figure 1:
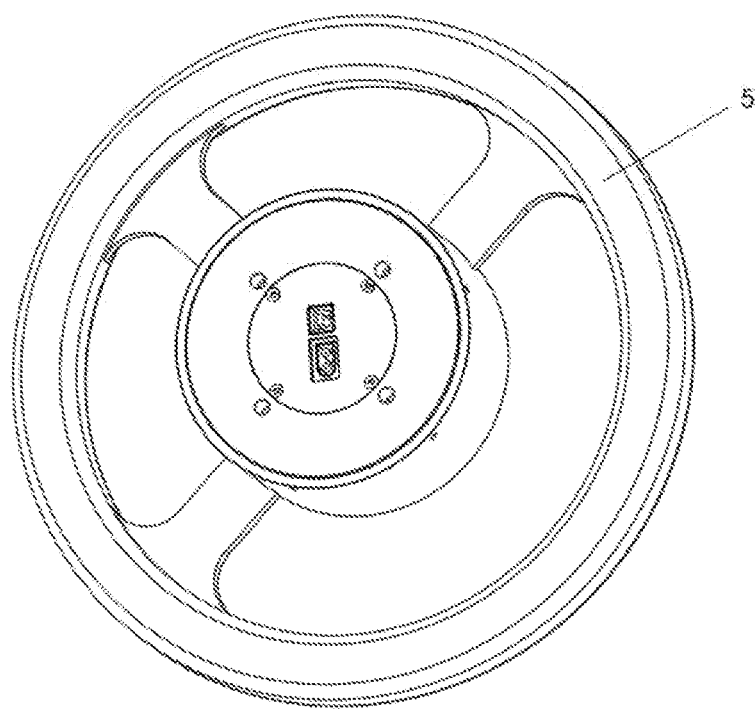
FIG. 1 is schematic diagram of embodiment 1 for the automobile steering simulator structure provided by the present application.

Reference signs: 1. Shell rotor; 2. Coil stator; 3. Permanent magnet; 4. Base; 5. Steering wheel; 6. First cavity; 7. Front end cover; 8. Second cavity; 9. First PCB board; 10. Second PCB board; 11. Magnetic encoder rotating shaft; 12. Conductive slip ring; 13. Position sensor; 14. Rear end cover; 15. Mounting plate; 16. USB interface; 17. External power supply port; 18. First bearing; 19. Second bearing; 20. Snap spring; 21. Base mounting hole.

DETAILED DESCRIPTION

In order to further understand the application content, characteristics and effects of the present application, the following embodiments are exemplified, and detailed descriptions are as follows in conjunction with the accompanying drawings.

Please refer to FIG. 1 to FIG. 7. The detailed description of . . . for embodiment of the present application is given in detail in conjunction with the accompanying drawings.

The automobile steering simulator structure comprises a shell rotor 1, a coil stator 2, permanent magnets 3, a base 4, a steering wheel 5, wherein the shell rotor 1, the coil stator 2 and the permanent magnets 3 form a slice motor, the steering wheel 5 is connected to outside of the shell rotor 1, and the shell rotor 1 is rotationally connected to the base 4, the coil stator 2 is arranged between the shell rotor 1 and the base 4, the permanent magnets 3 are arranged between the coil stator 2 and the shell rotor 1, a first cavity 6 is provided inside the base 4, a front end cover 7 is screwed on a side of the shell rotor 1 away from the base 4, a second cavity 8 is between the front end cover 7 and the shell rotor 1, a first PCB board 9 is arranged inside of the first cavity 6 and a second PCB board 10 is arranged inside of the second cavity 8, a magnetic encoder rotating shaft 11 rotationally installed in middle of the base 4 is arranged between the first cavity 6 and the second cavity 8, a conductive slip ring 12 is arranged outside the magnetic encoder rotating shaft 11, both ends of the conductive slip ring 12 are respectively connected to the first PCB board 9 and second PCB board 10 for transmitting signals, a position sensor 13 is arranged at bottom of the magnetic encoder rotating shaft 11.

The second PCB board 10 can be used as a button control board, and the first PCB board 9 can be used as a motor control board.

When the simulator is installed, connect the USB interface 16, the external power supply port 17 to the motor control plate with corresponding wires, then fix the base 4 by the base 4 mounting holes so that the simulator will not loosen and shake.

When the simulator is running, the user can set the parameters of the simulator through the button control plate arranged in the second cavity 8, and then control the steering wheel 5 to drive the shell rotor 1. The steering wheel 5 gives feedback to the user, so that the user can feel the experience of controlling the car in person.

Its working principle is: Firstly, the external power supply port 17 is powered on manually, so that the current is transmitted to the first PCB board 9 to be powered on. At the same time, another part of the current is transmitted to the position sensor 13 to start working. The position sensor 13 converts the position signal of the magnet pole of the shell rotor 1 into an electrical signal, transmits it to the first PCB board for processing by a single-chip microcomputer, and then communicates the electrical signal with an external device through the USB interface. The current is transmitted to the second cavity through the conductive slip ring, and then the current is transmitted to the second PCB to be energized, so that the motor drive board and the steering wheel key board are interconnected in a way of electric signal transmission.

Embodiment 1

Figure 2:
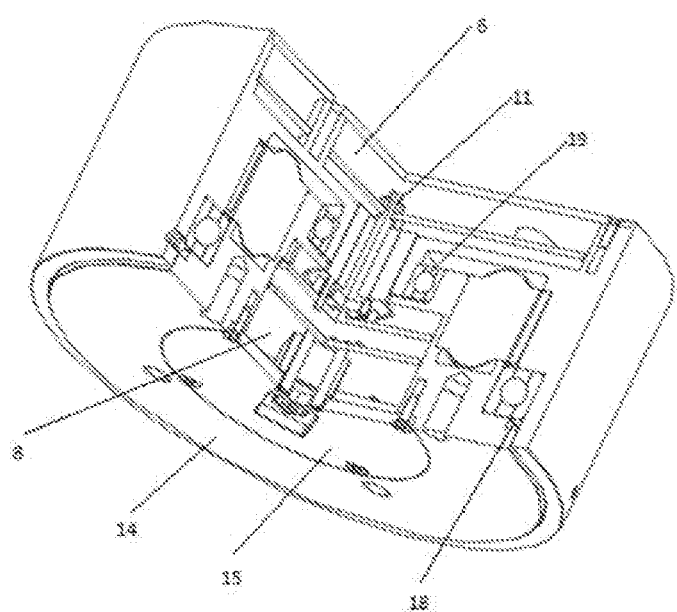
FIG. 2 is schematic diagram of the integrated internal structure of the shell rotor in FIG. 1 provided by the present application.
Figure 3:
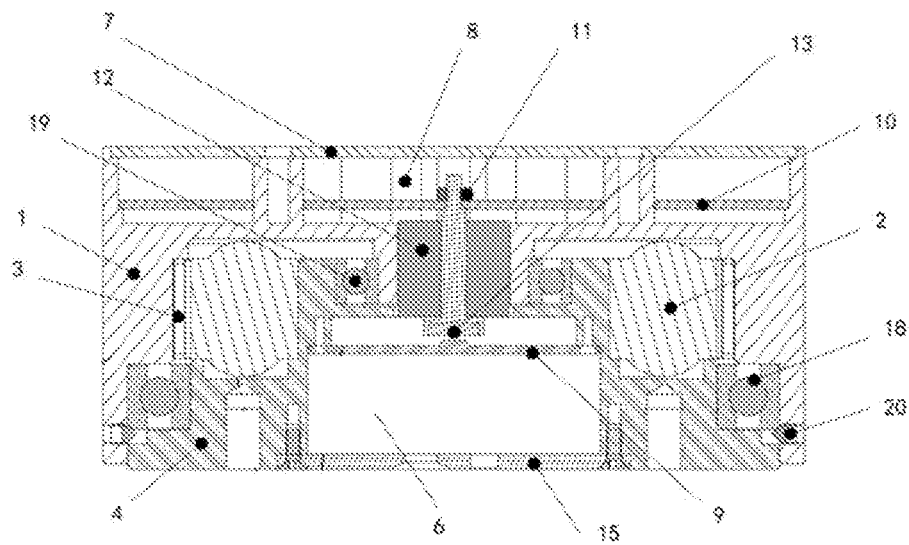
FIG. 3 is schematic diagram of sectional view for FIG. 2 provided by the present application.
Figure 4:
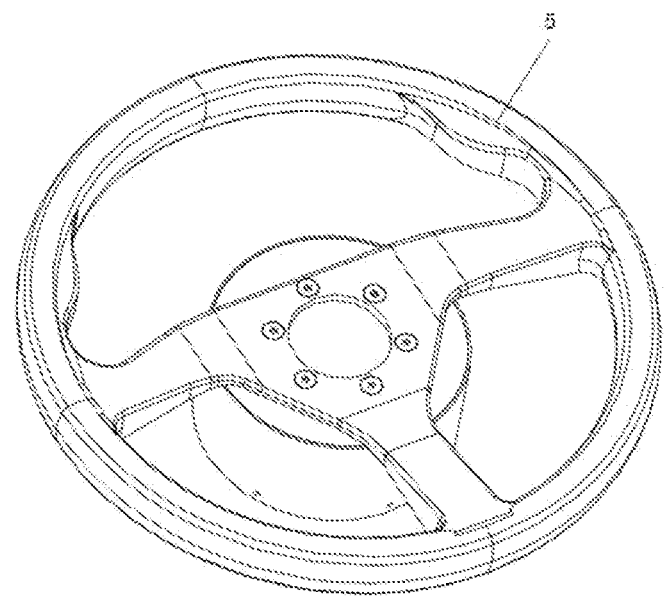
FIG. 4 is schematic diagram of embodiment 2 for the automobile steering simulator structure provided by the present application.
Figure 5:
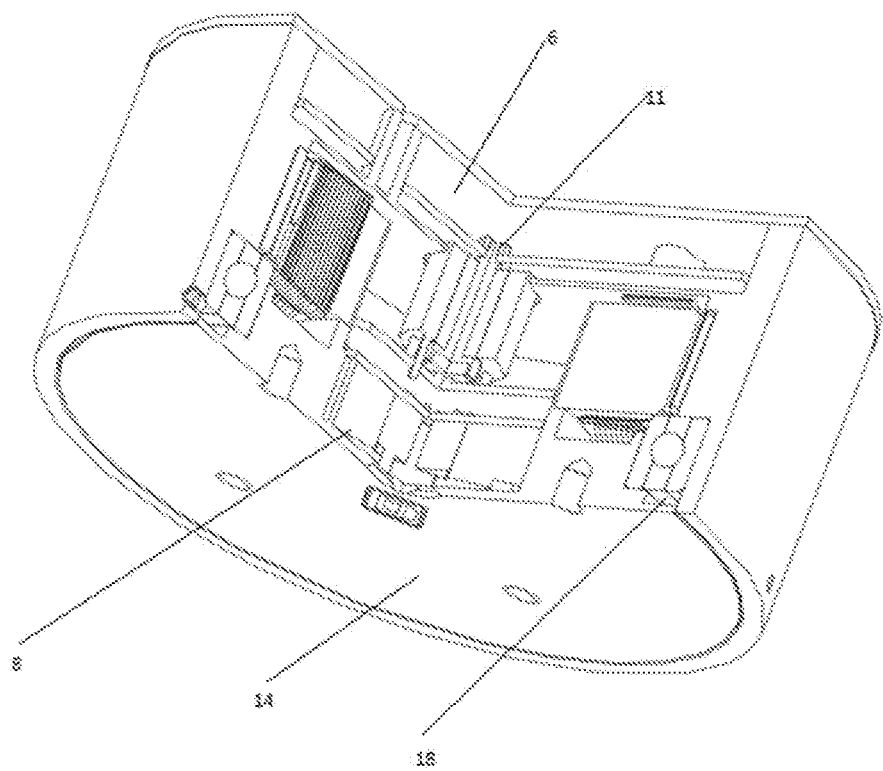
FIG. 5 is schematic diagram of the integrated internal structure of the shell rotor in FIG. 4 provided by the present application.
Figure 6:
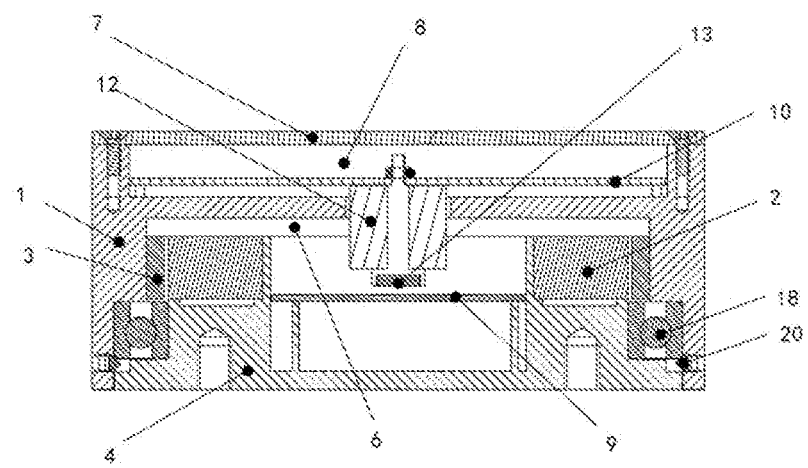
FIG. 6 is schematic diagram of sectional view in FIG. 5 provided by the present application.
Figure 7:
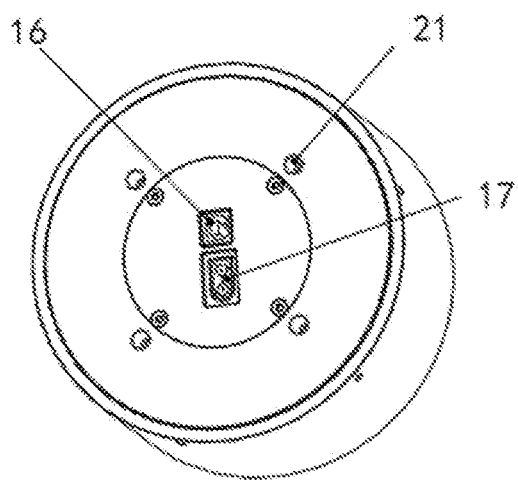
FIG. 7 is schematic diagram of the rear end cover in FIG. 4 provided by the present application.
Figure 8:
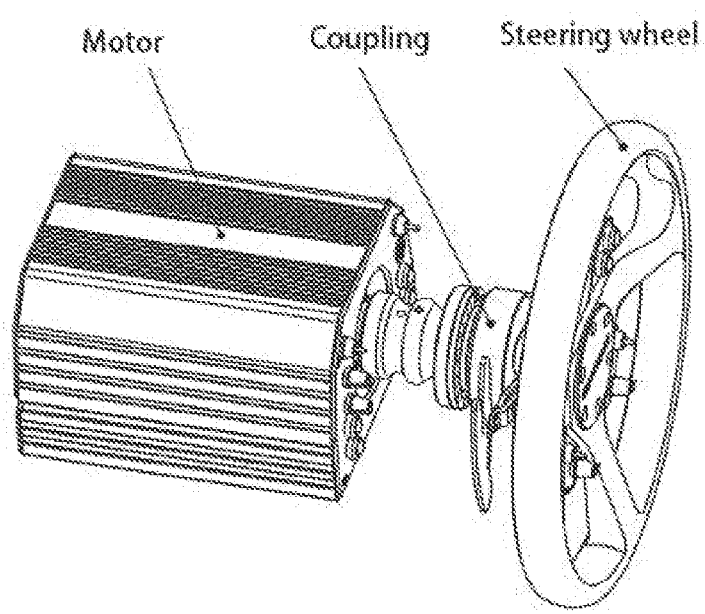
FIG. 8 is schematic reference diagram of background technology provided by the present application.

As shown in FIGS. 1-3, the steering wheel 5 and the shell rotor 1 are of an integrated structure.

A rear end cover 14 is screwed on the base 4, base mounting holes 21 arranged along a circumferential direction are formed on the rear end cover 14, and a mounting plate 15 is also screwed on the rear end cover 14, the mounting plate 15 is provided with an USB interface 16 and an external power supply port 17, and the USB interface 16 and external power supply port 17 are all connected with the first PCB board 9 through wires.

Furthermore, the shell rotor 1 and the base 4 are rotationally assembled through bearings, and a first bearing 18 and a second bearing 19 are provided in a height direction of the base 4, wherein the first bearing 18 is arranged near the rear end cover 14, and the second bearing 19 is arranged near the front end cover 7.

At the same time, a fastening screw 20 is provided between the shell rotor 1 and the base 4, and an outer ring of the first bearing 18 is locked by the fastening screw 20.

Embodiment 2

Compared with Embodiment 1, as shown in FIGS. 4-7, the steering wheel 5 in Embodiment 2 are screwed on a side of the shell rotor 1 close to the front end cover 7, and the USB interface 16 and the external power supply port 17 are directly provided on the base 4. The USB interface 16 and the external power supply port 17 are all connected to the first PCB board 9 through wires.

Meanwhile, a single first bearing 18 is provided, and the second bearing 19 is not provided.

Furthermore, on the basis of realizing the steering simulation of the automobile, compared with Embodiment 1, the cost can be saved.

Although the embodiments of the present application have been shown and described, those skilled in the art can understand that various changes, modifications and substitutions can be made to these embodiments without departing from the principle and spirit of the present application. The scope of the present application is defined by the claims appended hereto and their equivalents.

What is claimed is:

1. An automobile steering simulator structure comprising a shell rotor (1), a coil stator (2), permanent magnets (3), a base (4), a steering wheel (5), wherein the shell rotor (1), the coil stator (2) and the permanent magnets (3) form a slice motor, the steering wheel (5) is connected to outside of the shell rotor (1), and the shell rotor (1) is rotationally connected to the base (4), the coil stator (2) is arranged between the shell rotor (1) and the base (4), the permanent magnets (3) are arranged between the coil stator (2) and the shell rotor (1), a first cavity (6) is provided inside the base (4), a front end cover (7) is screwed on a side of the shell rotor (1) away from the base (4), a second cavity (8) is between the front end cover (7) and the shell rotor (1), a first PCB board (9) is arranged inside of the first cavity (6) and a second PCB board (10) is arranged inside of the second cavity (8), a magnetic encoder rotating shaft (11) rotationally installed in middle of the base (4) is arranged between the first cavity (6) and the second cavity (8), a conductive slip ring (12) is arranged outside the magnetic encoder rotating shaft (11), both ends of the conductive slip ring (12) are respectively connected to the first PCB board (9) and second PCB board (10) for transmitting signals, a position sensor (13) is arranged at bottom of the magnetic encoder rotating shaft (11).

2. An automobile steering simulator structure according to claim 1, wherein a rear end cover (14) is screwed on the base (4), base mounting holes (21) arranged along a circumferential direction are formed on the rear end cover (14), and a mounting plate (15) is also screwed on the rear end cover (14), the mounting plate (15) is provided with an USB interface (16) and an external power supply port (17), and the USB interface (16) and external power supply port (17) are all connected with the first PCB board (9) through wires.

3. An automobile steering simulator structure according to claim 2, wherein the shell rotor (1) and the base (4) are rotationally assembled through bearings, and a first bearing (18), a second bearing (19) are provided in a height direction of the base (4), wherein the first bearing (18) is arranged near the rear end cover (14), and the second bearing (19) is arranged near the front end cover (7).

4. An automobile steering simulator structure according to claim 3, wherein a fastening screw (20) is arranged between the shell rotor (1) and the base (4), and an outer ring of the first bearing (18) is locked by the fastening screw (20).

5. An automobile steering simulator structure according to claim 1, wherein the steering wheel (5) and the shell rotor (1) are an integrated structure.

6. An automobile steering simulator structure according to claim 1, wherein base (4) mounting holes arranged along a circumferential direction are formed on the base (4), and the base (4) is provided with an USB interface (16) and an external power supply port (17), and the USB interface (16) and the external power supply port (17) are all connected with the first PCB board (9) through wires.

7. An automobile steering simulator structure according to claim 1, wherein the steering wheel (5) is screwed on a side of the shell rotor (1) close to the front end cover (7).

* * * * *